US010881105B2

(12) United States Patent
Cohen et al.

(10) Patent No.: US 10,881,105 B2
(45) Date of Patent: Jan. 5, 2021

(54) METHOD FOR BREAKING DORMANCY IN DECIDUOUS TREES

(71) Applicant: Tapazol Chemical Works Ltd., Beit Shemesh (IL)

(72) Inventors: Ron Cohen, Kibbutz Lahav (IL); Pablo Liberman, Or Yehuda (IL)

(73) Assignee: Tapazol Chemical Works Ltd., Beit Shemesh (IL)

( * ) Notice: Subject to any disclaimer, the term of this patent is extended or adjusted under 35 U.S.C. 154(b) by 0 days.

(21) Appl. No.: 15/308,309

(22) PCT Filed: Apr. 30, 2015

(86) PCT No.: PCT/IL2015/050450
§ 371 (c)(1),
(2) Date: Nov. 1, 2016

(87) PCT Pub. No.: WO2015/166499
PCT Pub. Date: Nov. 5, 2015

(65) Prior Publication Data
US 2017/0049103 A1    Feb. 23, 2017

(30) Foreign Application Priority Data
May 1, 2014    (IL) .......................................... 232411

(51) Int. Cl.
*A01N 43/40*    (2006.01)
(52) U.S. Cl.
CPC ................................... *A01N 43/40* (2013.01)
(58) Field of Classification Search
USPC ....................................................... 504/260
See application file for complete search history.

(56) References Cited

U.S. PATENT DOCUMENTS

| 4,487,625 | A |   | 12/1984 | Rieder |   |
|---|---|---|---|---|---|
| 6,588,142 | B2 | * | 7/2003 | Curtis | .................... A01N 43/40 106/13 |
| 8,173,175 | B2 |   | 5/2012 | Perez Correa et al. |   |
| 2011/0028528 | A1 |   | 2/2011 | Ishihara et al. |   |
| 2011/0251070 | A1 | * | 10/2011 | Poffenberger | ......... A01N 25/30 504/358 |
| 2012/0060573 | A1 |   | 3/2012 | Posner et al. |   |
| 2013/0102465 | A1 | * | 4/2013 | Lovatt | .................... A01N 43/90 504/136 |

FOREIGN PATENT DOCUMENTS

| CA | 2 804 600 | A1 |   | 4/2012 |   |
|---|---|---|---|---|---|
| CN | 101 984 815 | A |   | 3/2011 |   |
| CN | 101984815 | A | * | 3/2011 |   |
| CN | 102 150 656 | A |   | 8/2011 |   |
| CN | 104 054 709 | A |   | 9/2014 |   |
| GB | 2 059 412 | A |   | 4/1981 |   |
| IL |   | 119754 | A | 1/2001 |   |
| JP | 2005/176728 | A |   | 7/2005 |   |
| WO | 98/27814 | A1 |   | 7/1998 |   |
| WO | 01/70019 | A2 |   | 9/2001 |   |
| WO | WO-0170019 | A2 | * | 9/2001 | ............. A01N 43/40 |

OTHER PUBLICATIONS

Biggs, "Screening Chemicals for the Capacity to Modify Bud Dormancy of Peaches", Florida State Horticultural Society, pp. 383-386, (1966).
Calderon-Zavala et al., Thidiazuron (N-Phenil-N1-(1,2,3-Thidiazol-5-yl)Urea) as a Promoter of Budbreak on Peach (*Prunus persica* L. Batsch) and Japanese Plum (*Prunus salicina* Lindl.), Revista Chapingo Serie Horticultura, vol. 6, No. 1, pp. 117-120, (2000).
Cannell et al., "Climatic Warming, Spring Budburst and Forest Damage on Trees", J. Appl. Ecol, vol. 23, pp. 177-191, (1986).
Dozier, Jr., et al., "Hydrogen Cyanamide Induces Budbreak of Peaches and Nectarines Following Inadequate Chilling" HortScience, vol. 25, No. 12, pp. 1573-1575, (1990).
Hanninen, "Modelling Bud Dormancy Release in Trees from Cool and Temperate Regions", Acta For. Fenn, vol. 213, pp. 1-47, (1990).
Hegazi, "Effects of Some Dormancy Breaking Agents on Flowering, Fruiting and Fruit Characteristics of 'Canino' Apricot Cultivar", World Journal of Agricultural Sciences, vol. 8, No. 2, pp. 169-173, (2012).
Heide, "Daylength and thermal time responses of budburst during dormancy release in some northern deciduous trees", Physiol. Plant, vol. 88, pp. 531-540, (1993).
Murray et al., "Date of Budburst of Fifteen Tree Species in Britain Following Climatic Warming", J. Appl. Ecol, vol. 26, pp. 693-700, (1989).
Petri, "Breaking Dormancy of Apple Trees with Chemicals", Acta Horticulturae, vol. 199, pp. 109-117, (1987).
Rohde et al., "Plant dormancy in the perennial context", Trends Plant Sci, vol. 12, No. 5, pp. 217-223, (2007).
Saure, "Dormancy Release in Deciduous Fruit Trees" Horticultural Reviews, Janick , J . (Ed .), vol. 7, pp. 239-287, (1985).
Tapazol Chemical Works Ltd. Aug. 24, 2011. p. 1-6 XP 055197523.

* cited by examiner

*Primary Examiner* — Johann R Richter
*Assistant Examiner* — Courtney A Brown
(74) *Attorney, Agent, or Firm* — Vorys, Sater, Seymour and Pease LLP; Anthony Venturino

(57) ABSTRACT

Provided is a method and a composition for breaking dormancy in deciduous trees.

7 Claims, No Drawings

METHOD FOR BREAKING DORMANCY IN DECIDUOUS TREES

TECHNOLOGICAL FIELD

The invention generally relates to a method for breaking dormancy in deciduous trees using pyridinamine based agents.

BACKGROUND OF THE INVENTION

Unlike animals, plants do not have the luxury of body insulation or locomotion and so cannot seek shelter or use other active ways to endure water shortages and cold climates. Therefore, many plants become dormant to avoid harsh environmental conditions. In dormancy, their metabolic activity either ceases or is drastically reduced.

Deciduous fruit tree species are usually temperate, growing well in climates where summers are warm and winters are cool. Most deciduous fruit trees go through a period of dormancy during the winter months, especially in northern regions. Dormancy is brought about by decreasing day length (photoperiodism), cold and sometimes by drought conditions.

Temperate deciduous fruit trees sense environmental signals such as decrease in day length and reduction in temperature, which indicate winter and set off reductions in growth rate, onset of endodormancy (in which a plant will not grow even under good, warm, growing conditions), development of bud scales and leaf fall. As buds enter endodormancy, warm temperatures (>15° C.) no longer encourage growth. Periods of a few weeks (or even months) of chilling (at 0-12° C.) are required to overcome endodormancy. The plant then enters ecodormancy when it will react to warm temperatures with bud burst.

Rohde and Bhalerao [1] proposed a definition of dormancy as the inability to initiate growth from meristems (and other organs and cells with the capacity to resume growth) under favorable conditions.

Trees may look inactive going into dormancy but the fact is that they continue to regulate their metabolism and only slow down some physiological activities. The dormancy process determines to what extent fruit crops will survive the winter and early spring without shoot and flower bud damage and, in long-lived forest species, the duration of dormancy limits the growing season and thus affects wood production and quality. Consequently, the times at which dormancy begins and ends are critical ecological variables.

Breaking of the dormant state is affected by chilling temperatures during winter. The effect of chilling is cumulative, increasing up to a threshold when the buds are fully released from dormancy Subsequent bud burst and growth resumption in spring occur after the accumulation of a certain heat sum above a specific base temperature [2].

In response to global warming, the chilling requirement might not be fully met, and bud burst would then be delayed; alternatively, in an environment where the chilling requirement is presently far exceeded, bud burst would occur earlier than at present [3, 4] leading to an increased frequency of frost injury in spring [5].

Chilling hours required for the breaking of dormancy are a concern to fruit growers. For example, peach trees cannot be grown in southern Florida or California because the trees do not receive adequate chilling to break winter dormancy. When peaches are grown in the north, however, they often flush rapidly in the spring and become injured by frosts. Growers try to match peach varieties by the amount of chilling hours needed to break dormancy and regions of the country where these hours can be met safely.

Thus, in order to counter the lack of winter cold required by deciduous fruit trees cultivated in regions of warm winter, various attempts have been made to break up bud dormancy by using natural and synthetic growth substances.

A summary of some of these chemicals can be found in Saure, MC, [6].

Petri, J I, used mineral oil plus dinitro-butyl-pheno (at ~0.15%) to break dormancy [7]

WO1998027814 [8] discloses compositions for breaking the dormancy of deciduous fruit trees comprising a combination of ethephon or gibberilic acid and a suitable oil.

JP 2005/176728 [9] discloses agents that contain $H_2O_2$ as an active ingredient for the spontaneous waking up from the dormancy.

U.S. Patent Application No. 2012/060573 [10] discloses methods of inducing bud break of deciduous fruit vines, trees, or shrubs following dormancy by the application of bud breaker compositions that do not contain hydrogen cyanamide.

GB 2059412 [11] discloses the application of an aqueous solution of a choline salt to enhance the reproductive development of plants including deciduous fruit trees such as apple, pear, plum, and peach trees. It is described that treatment of deciduous fruit trees results in break of dormancy.

U.S. Pat. No. 8,173,175 [12] discloses an ammoniacal solution of sodium azide ($NaN_3$) or other azide salts that in low concentrations induces the budding of grapevine buds and potentially other deciduous fruit trees with the same efficiency as $H_2CN_2$ makes.

CA 2804600 [13] disclosed methods of inducing bud break of deciduous plants, following dormancy by the application of a composition by either foliar application, drip (soil) application, or both, wherein the composition contains five or more of the components of the group consisting of nitrogen, phosphorus, potassium, calcium, magnesium, trace elements, acidifier, fulvic acid, and seaweed, and where the composition or compositions do not contain hydrogen cyanamide.

Hydrogen cyanamide has been used to break up dormancy on fruit crops worldwide to compensate for a lack of winter chilling and/or to initiate an earlier and more even fruiting bud break [14].

U.S. Pat. No. 4,487,625 [15] described methods of treatment the dormant buds of grapevines by use of an aqueous cyanamide solution for releasing bud dormancy.

Fluazinam ($C_{13}H_4Cl_2F_6N_4O_4$) is a broad spectrum contact pyridinamine fungicide that can be applied as a foliar spray or soil treatment.

U.S. Pat. No. 6,588,142 [16] discloses a method of reducing cold injury or damage to plants such as peanut, citrus trees, peaches, strawberries and other plants susceptible to cold injury such as frost or freezing comprises applying a pyridylaniline active agent such as fluazinam to the plant in an amount effective to reduce cold injury to the plant.

REFERENCES

[1] Rohde and Bhalerao. *Trends Plant Sci.* 2007; 12(5): 217-23.
[2] Hanninen, H., *Acta For. Fenn.* 1990; 213:1-47.
[3] Murray et al., *J. Appl. Ecol.* 1989; 26: 693-700
[4] Heide, O M., *Physiol. Plant.* 1993; 88:531-540
[5] Cannell and Smith. *J. Appl. Ecol.* 1986; 23:177-191

[6] Saure, M. C., Janick, J. (Ed.), *Horticultural Reviews*. 1985; 7, pp. 239-287
[7] Petri J L, At el., *Acta Horticulturae*. 1987; 199: 109-117.
[8] WO1998027814
[9] JP 2005/176728
[10] US 2012/060573
[11] GB 2059412
[12] U.S. Pat. No. 8,173,175
[13] CA 2804600
[14] Dozier, W A, et al., *Hortscience*. 1990; 25(12):1573-1575).
[15] U.S. Pat. No. 4,487,625
[16] U.S. Pat. No. 6,588,142

SUMMARY OF THE INVENTION

In deciduous trees, vining plants (e.g. grape vines) and various shrubs and bushes dormancy is generally initiated by exposing buds to sufficient periods of chilling. This means that the dormancy can generally only be terminated if the buds have been exposed to chilling periods that are insufficient to continue dormancy, followed by an experience of elevated temperatures. The amount of chilling required depends upon the nature of the cultivar. Without sufficient chilling, the buds can be devoid of a commercially acceptable yield of fruit. Problems in dormancy release can occur in climates in which there is inadequate chilling such as tropical, semi-tropical and desert climates. Symptoms of inadequate chilling periods manifest themselves in growth abnormalities such as delayed and weak leaf growth, delayed and protracted blossoming, poor leaf cover, poor fruit development (e.g. insufficient or inconsistent fruit-set and reduced fruit size) and irregular ripening. In addition, a defective dormancy release may lead to a heat stroke of the plants thereby harming crop yield.

Thus, there exists a need for a methodology that could enable uniform bud burst following dormancy release to enable harvesting of fruit (e.g. deciduous fruit trees), in one stage, thereby reducing harvesting cost.

The inventors of the present invention have surprisingly found that the application (e.g. foliar application) of phenyl-pyridinamine based agents to deciduous plants (e.g. deciduous fruit trees) results in a rapid as well as a uniform release of the deciduous plants from dormancy.

Thus, the present invention provides in one of its aspects, a composition comprising at least one phenyl-pyridinamine agent for inducing bud break (or for inducing and/or improving dormancy release) in a deciduous plant.

The invention also provides a method for inducing bud break or for inducing and/or improving dormancy release in a deciduous plant, the method comprising applying to at least a part of the plant a dormancy breaking composition comprising at least one phenyl-pyridinamine agent such that the bud break of the plant is induced or improved.

As used herein, the term "inducing or improving dormancy release" refers to the induction of bud break in a plant following the application of the dormancy release composition of the invention.

The improvement in dormancy release (interchangeable herein with "bud break" or "bud burst") is reflected in any of the following: advancing the time of bloom, bud break and/or leaf cover; increased fruit set and crop yield; improved quality of the fruit; increase in the uniformity of dormancy release among plants (e.g. deciduous fruit trees) of the same species upon application of the composition of the invention as compared to untreated plants or to plant treated with other dormancy release agents.

Thus, for example, the application of the composition of the invention to temperate deciduous fruit trees which receive insufficient chilling results in optimal bud break wherein the bud break occurrences among the trees are more uniform as compared to untreated trees or to trees treated with other dormancy release agents.

As used herein, the term "deciduous plant" generally refers to any tree, shrub and herbaceous perennial that loses all or most of its leaves for part of the year. In some embodiments, the deciduous plant is selected from a deciduous fruit tree, grape or kiwifruit vines, shrubs or bushes.

Some non-limiting examples of deciduous fruit trees include apples, almonds, walnuts, chestnuts, pecans, pears, cherries, apricots, peaches, figs, morus, plums, mulberry, nashi, persimmon, quince, gingko, pomegranate, nectarines; pluots, apriums, apriplums, plumcots (various hybrids of a plum and an apricot).

Some non-limiting examples of deciduous fruit vines include grape, kiwifruit, pitaya and passionfruit.

Some non-limiting examples of deciduous shrubs or bushes include berries (e.g. strawberries, raspberries, cranberries, blackberries and loganberries).

In some embodiments, the deciduous plant is a semi-deciduous plant which loses old foliage as new growth begins.

In some embodiments, the deciduous plant is a plant that grows in climates with adequate chilling hours.

In other embodiments, the deciduous plant is a plant that grows in climates in which dormancy does not occur naturally (e.g. a climate in which plants must be forced into dormancy).

In accordance with the present invention, the composition of the invention may be applied to the plant before bud break would naturally occur, i.e. to result in an earlier bud break so as to obtain a more uniform fruiting bud break.

The application of the composition of the invention to the plant or part thereof can be carried out in any suitable manner known to the skilled artesian for applying dormancy breaking agents to plants. In some embodiments, the compositions are applied to the plants by foliar application. When using foliar application, a part or the entire canopy of the plant (e.g. deciduous tree) may be treated, e.g., sprayed.

The composition of the present invention may be generally applied to the deciduous plant in any manner suitable in the pertinent filed of the art depending on the specific requirements of the grower (e.g. using knapsack sprayer for small plantings up to an acre in size).

In some embodiments, a composition of the present invention may be applied to the deciduous plant using one of the following devices: a knapsack sprayer, a hand held spray gun, mist blowers, and aerial spraying equipment among others may be used.

Thus, in accordance with the method of the present invention, a grower may decide on how to apply the composition of the invention and on the timing of the application of said composition depending on various parameters that relate to both the type of cultivar and to the environment in which the cultivar grows.

In another one of its aspects, the present invention provides a dormancy breaking composition comprising at least one phenyl-pyridinamine agent.

In some embodiments, the phenyl-pyridinamine agent is fluazinam (3-chloro-N-(3-chloro-5-trifluoromethyl-2-pyridyl)-α,α,α-trifluoro-2,6-dinitro-p-toluidine).

The dormancy breaking composition of the present invention is useful for inducing and/or improving dormancy release in deciduous plants. For the purpose of inducing and/or improving dormancy release in deciduous plants, the herein described dormancy breaking composition may further contain various additives which act to promote the activity of composition. Some non-limiting examples of such additives include hydrogen cyanamide, alkali metal and earth alkali metal nitrates (e.g. sodium nitrate, potassium nitrate, and calcium nitrate, ammonium nitrates and mixtures thereof) choline salts (e.g. choline borate), alkoxylated amines, alkoxylated quaternary ammonium compounds and others.

The dormancy breaking composition of the present invention may be mixed with a solvent, such as water and/or oil (having an emulsifier added to allow the oil to be mixed with water), to produce an appropriate concentration for spraying the deciduous plant, e.g. in the process of foliar application. The emulsifier in the dormancy breaking composition may act to improve the distribution of the dormancy breaking agent over the deciduous plant (or any part thereof) treated with the composition.

Any of the known types of emulsifiers may be used in a composition in accordance with the present invention, as long as they augment in achieving an even distribution of the at least one phenyl-pyridinamine agent of the invention over the deciduous plant species to be treated. By routine experimentation one of ordinary skill in the art can establish which emulsifiers work, which do not, and which work best for a particular case.

The oil may be a mineral oil or a vegetable oil. Some non-limiting examples of oils that can be used as carriers in the dormancy breaking composition of the present invention include olive oil, soybean oil, rapeseed oil, corn oil, sunflower oil, cottonseed oil, linseed oil, safflower oil, walnut oil, peanut oil, olive oil, rapeseed oil or castor oil and mixtures thereof.

In some embodiments, the dormancy breaking composition further comprises an allcylsiloxane compound and/or triglyceride to improve the coverage of the composition on the treated deciduous plant (e.g. when used in a spray).

Other optional additives which may be included in a composition of the invention, depending on the specific requirements of the composition (e.g. application method, climate, etc) are dispersants, antifreeze agents (e.g. urea, glycerol, propylene glycol), antifoaming agents (e.g. silicone oils, magnesium stearate), preservatives, antioxidants (e.g. butylated hydroxytoluene), spreading agents and thickeners.

The desired concentration of the phenyl-pyridinamine agent in the dormancy breaking composition of the present invention depends of the type of cultivar (e.g. on the number of chill hours required by the specific type and variety of fruit or nut), on the climate in which the cultivar grows and on various additional parameters as recognized by the person of skill in the art. For example, deciduous fruit trees having a high chill requirement for dormancy release (e.g. grape species, apples) will typically require a relatively high concentration of the phenyl-pyridinamine agent in the composition of the invention as compared to trees having a lower chill requirement, such as peaches.

In some embodiments, the phenyl-pyridinamine agent is used in combination with at least one additional dormancy breaking agent. In accordance with the present invention, the additional dormancy breaking agent may be any material that is known to induce bud break in deciduous trees.

In some embodiments the additional agent is selected from dinocap, meptyldinocap, hydrogen cyanamide (e.g. Dormex™), zinc sulphate, urea and thiourea.

As used herein the "chill (or chilling) requirement" of a deciduous fruit plant is the minimum period of cold weather after which a fruit-bearing tree will blossom. The chill requirement is generally expressed in chill hours, which is typically calculated by adding up the total amount of time in a winter spent at certain temperatures.

In some embodiment, the dormancy breaking composition of the present invention further comprises at least one plant growth regulating compounds (e.g. a fatty acid ester, a fatty acid amide).

In some embodiment, the dormancy breaking composition of the present invention further comprises at least one fungicide, miticide and/or bactericide.

In accordance with the present invention, the concentration of the phenyl-pyridinamine agent in the dormancy breaking composition may be between about 5 gram/liter to between about 150 gram/liter. In some embodiments, the concentration of the phenyl-pyridinamine agent in the dormancy breaking composition is between 10 and 20 gram/liter.

It is important to note that embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

DETAILED DESCRIPTION OF EMBODIMENTS

Example 1: Dormancy Release in Black Gem (*P. nigra*) Plums

The efficacy of fluazinam in inducing dormancy release in plums was examined in black gem plums which have relatively low chilling requirements of about 200 hours. On the day in which spraying was initiated the number of accumulated chilling units was 14 (being equivalent of 200 hours of chilling). The trees were at a stage where 10% of the bulbs were swollen.

Bud Break Assessment:

Three branches facing different directions were selected in each tree.

The upper 20 cm in each branch were examined Each branch contained approximately 13 buds.

Each bud was evaluated for bud progression on three separate occasions and bud progression percentages were normalized across the examined branches The scheme of the experiment is depicted in Table 1.

TABLE 1

Scheme of dormancy release in black gem experiment

| Planting | Type of soil | Irrigation | Phono-logical stage | Experiment scheme | No. of treatments | No. of blocks | Size of block | application | wheather |
|---|---|---|---|---|---|---|---|---|---|
| 3 × 5 (meters) | heavy | drip | dormancy | Randomized blocks | 4 | 4 | 2 trees per repetition | a knapsack sprayer (100 liter per dunam) | Typical for season |

The various treatments applied to the trees and their effects are summarized in Table 2 and Table 3. The results of the bud break assessment experiment are summarized in Table 3.

TABLE 2

Compositions used in dormancy release in black gem experiment.

| Number | Composition | Amount (percent volume) | Active agent (concentration and, Formula) | Company |
|---|---|---|---|---|
| 1 | control | — | — | — |
| 2 | Narozol | 5 | Perranic Oil 80% EW | Tapazol |
| 3 | NAM15 | 5 | Perranic Oil 80% + Fluazinam 15 gram/liter EW | Tapazol |
| 4 | Fluazinam | 5 | Perranic Oil 80% + Fluazinam 30 gram/liter EW | Tapazol |
| 5 | Fluazinam | 5 | Perranic Oil 80% + Fluazinam 60 gram/liter EW | Tapazol |
| 6 | Fluazinam | 5 | Perranic Oil 80% + Fluazinam 120 gram/liter EW | Tapazol |
| 8 | Dino Super | 5 | Meptyldinocap 15 g/l EC | Tarsis spray |

As shown in Table 3, Fluazinam at 15 g/l (NAM15) acted similarly to Dino super in all tested parameters and dates. When the data was analyzed as a continuous variable (X axis—concentration of Fluazinam in oil), a negative regression graph was seen pointing to the fact that above 15 grams per liter oil (of fluazinam) the efficacy of the composition decreased (when the oil contains an active agent; not shown).

The differences between the treatments were maintained until the development of fruit. The graph of fruit development in Prumus is a double sigmoid line (the fruit ceases to grow at a certain stage after the pit hardening) so it is hard to determine whether the oil led to early ripening with or without fruit-picking.

Example 2: Dormancy Release in Black Gem (*P. nigra*) Plums

The experiment was done in a relatively warm year with above average temperatures. The black gem plum is typically sprayed before the beginning of February. On the day spraying was initiated 150 chilling hours were accumulated.

The scheme of the experiment is depicted in Table 4.

TABLE 3

Treatment of plum trees with fluazinam to induce dormancy release (all Fluazinam based treatments further contained narozol oil at a final concentration of 5%); separate treatments are considered statistically significant if the letters a, b or c are not shared between them.

| | Experiment I S + 20 | | Experiment II S + 33 | | Experiment III | | |
|---|---|---|---|---|---|---|---|
| | | | | | | S + 40 | |
| Concentration of active agent grams/liter oil | Percent of dormant bulb | Percent of green bulb | Percent of green bulb | blossom | white bulb | blossom | fall |
| Hiks | 53.5 | 44.3 c | 59.5 a | 2.6 b | 17.4 a | 78 ab | 0 b |
| narozol | 49.8 | 50.2 bc | 23.4 b | 32.8 ab | 9.5 ab | 68 ab | 8.9 b |
| NAM15 (fluazinam 15 g/l) | 19.6 | 80.4 a | 4.2 b | 66.1 a | 1.3 b | 75.4 ab | 13 ab |
| Fluazinam 30 g/l | 22.4 | 74.4 ab | 6.9 b | 66.4 a | 0.5 b | 52 b | 44 a |
| Fluazinam 60 g/l | 26.6 | 73.4 ab | 16.3 b | 63.54 a | 4.1 ab | 69 ab | 20.3 ab |
| Fluazinam 120 g/l | 30.7 | 69.2 abc | 10.4 b | 49 ab | 2.6 b | 79 ab | 6.8 b |
| Dino super 15 | 17.6 | 82.4 a | 9.2 b | 43.4 ab | 1 b | 88 a | 6.5 b |

TABLE 4

Scheme of dormancy release in black gem experiment.

| Planting | No. of blocks | Size of block | Experiment scheme | spray |
|---|---|---|---|---|
| 66 trees per dunam (1000 m$^2$) | 4 | 3 trees | Randomized blocks | 80 liter per dunam (1000 m$^2$) |

The spraying was carried out is a section of the cultivated area in which all bud appear to be dormant Nine annual branches were marked, 3 branches per tree.

The trees were marked at the upper 20 cm of the branches. The percent of dormancy release was calculated wherein 100% represent the total number of buds on a branch. In each tree the north, south and east facing branches were marked. All branches were marked one day before spraying when the tree was still completely dormant. The stages of dormancy release examined were: 1. Dormant bud; 2. Swollen bud; 3. Green bud; 4. Shooting; 5. White bud; 6. Flowering; and 7. Blossom.

The analysis of the results was carried out using the JMP 7 program (http://www.jmp.com). Significance was determined using a Tukey-Kramer test at 95% significance. Arcsine transformation was applied in cases wherein values were lower than 30% or higher than 70%. The values of its assessment were analyzed a number of times wherein all treatment were analyzed for determining the optimal concentration for Fluazinam.

TABLE 5

Summary of agents used in dormancy release experiment in black gem.

| No. | Composition | amount (% volume) | Active agent (concentration) | Company |
|---|---|---|---|---|
| 1. | NONE | — | — | — |
| 2. | NAM15 | 2.5 | Fluazinam 15 g/l EW | Tapazol |
| 3. | NAM15 | 5 | Fluazinam 15 g/l EW | Tapazol |
| 4. | NAM15 | 5 | Fluazinam 15 g/l EW | Tapazol |
| 5. | NAM15 | 10 | Fluazinam 15 g/l EW | Tapazol |
| 6. | NAM15 | 5 | Fluazinam 15 g/l EW | Tapazol |
|  | Dormax ™ | 0.5 | Hydrogen cyanamide 490 g/l Sl |  |
| 11. | Dino super 15 | 5 | Meptyldinocap 15 g/EW | Spray |
| 12 | Dino super 15 | 5 | Meptyldinocap 15 g/EW | Spray |
|  | Dormax ™ | 0.5 | Hydrogen cyanamide 490 g/l Sl | Agan |

Seventeen days after spraying, in all treatments the number of dormant buds was lower than 5% and significantly lower than that the 10% for the control.

Trees sprayed with NAM15 (5%) in combination with Dormax™ were at a later stage of bud break and the number of buds that emerged was significantly higher than in the control group (Table 6).

TABLE 6

The effect of spraying NAM15 on dormancy release measured 17 days post spraying.

| Treatment | Dormant (%) | significance | Swollen (%) | significance | Green (%) | significance | Shooting (%) | significance |
|---|---|---|---|---|---|---|---|---|
| NAM 15 32.5% | 2.9 | b | 65.3 | ns | 23.9 | ab | 8.0 | ab |
| NAM 15 5% | 4.3 | b | 63.4 |  | 28.5 | ab | 3.8 | ab |
| NAM 15 10% | 7.8 | ab | 58.4 |  | 16.7 | ab | 17.1 | ab |
| NAM 15 5% + Dormax ™ 0.5% | 3.7 | b | 23.4 |  | 49.6 | a | 23.4 | a |
| control | 34.0 | a | 65.5 |  | 0.5 | b | 0 | b |

Examining the Harvest Components:

Three harvests were carried out during the experiment. One selective harvest and 2 harvests in which all fruit were picked.

In the first fruit picking harvests 1, 2 and half of block 3 were picked and in the third picking harvests, half of picking block 3 and all of block 4 was picked. Each repeat was weighed separately. The results were presented as net weight of fruit per dunam (1000 m$^2$) wherein each block was divided by 3 and multiplied by 66 (3 tree per block and 66 tree per dunam).

In all harvests 60 fruit were selected for weighing single fruits for assessing the effect of oil on fruit size. The fruit were weighed in six groups of 10 fruit. 240 fruits were weighed in total.

The invention claimed is:

1. A method for inducing bud break or for inducing and/or improving dormancy release in a deciduous plant, the method comprising:
   providing the deciduous plant in an environment in which the plant receives insufficient chilling or in an environment in which dormancy does not occur in the plant naturally; and
   applying a composition consisting of fluazinam and a carrier to at least a part of the plant.

2. The method according to claim 1, wherein the deciduous plant is a deciduous fruit tree.

3. The method according to claim 2, wherein the deciduous fruit tree is selected from the group consisting of apples, almonds, walnuts, chestnuts, pecans, pears, cherries, apricots, peaches, figs, morus, plums, mulberry, nashi, persimmon, quince, gingko, pomegranate, nectarines, pluots, apriums, apriplums and plumcots.

4. The method according to claim 1, wherein the carrier is an oil, wherein the concentration of the fluazinam in the composition is between 10 and 20 gram/liter.

5. The method according to claim 4, wherein the oil is a mineral oil or a vegetable oil.

6. The method according to claim 4, wherein the oil is an olive oil, soybean oil, rapeseed oil, corn oil, sunflower oil, cottonseed oil, linseed oil, safflower oil, walnut oil, peanut oil, olive oil, rapeseed oil or castor oil or mixtures thereof, wherein the deciduous fruit tree is selected from the group consisting of apples, almonds, walnuts, chestnuts, pecans, pears, cherries, apricots, peaches, figs, morus, plums, mulberry, nashi, persimmon, quince, gingko, pomegranate, nectarines, pluots, apriums, apriplums and plumcots.

7. The method according to claim 1, wherein the concentration of the fluazinam in the composition is between 10 and 20 gram/liter.

\* \* \* \* \*